(12) United States Patent
Kolar et al.

(10) Patent No.: US 6,194,013 B1
(45) Date of Patent: Feb. 27, 2001

(54) METHOD AND APPARATUS FOR CONTROLLING THE BLENDING OF DRINKS

(75) Inventors: David J. Kolar, Streetsboro; Benjamin J. Dastoli, Brunswick; Brent A. Miller, Olmsted Township; David J. Barnard, North Olmsted; Richard D. Boozer, Wakeman, all of OH (US)

(73) Assignee: Vita-Mix Corporation, Cleveland, OH (US)

( * ) Notice: Subject to any disclaimer, the term of this patent is extended or adjusted under 35 U.S.C. 154(b) by 0 days.

(21) Appl. No.: 09/407,792

(22) Filed: Sep. 29, 1999

(51) Int. Cl.⁷ ................................ A23L 2/00; A47J 43/00
(52) U.S. Cl. .......................... 426/231; 99/275; 222/77; 366/141
(58) Field of Search ........................ 426/231, 524; 366/141, 205; 99/275, 300, 484; 222/77, 58

(56) References Cited

U.S. PATENT DOCUMENTS

| 4,276,750 | 7/1981 | Kawasumi | 62/137 |
|---|---|---|---|
| 4,528,824 | 7/1985 | Herbert | 62/331 |
| 4,588,004 | 5/1986 | Herbert | 141/377 |
| 4,653,281 | 3/1987 | Van Der Veer | 62/71 |
| 4,681,030 | 7/1987 | Herbert | 99/484 |
| 4,962,895 | 10/1990 | Gallaher | 241/101.2 |
| 4,998,677 | 3/1991 | Gallaher | 241/95 |
| 5,156,297 | * 10/1992 | Engler | 222/77 |
| 5,323,691 | 6/1994 | Reese et al. | 99/275 |
| 5,619,901 | 4/1997 | Reese et al. | 99/275 |
| 5,799,567 | * 9/1998 | Dorner | 366/141 |

* cited by examiner

Primary Examiner—George C. Yeung
(74) Attorney, Agent, or Firm—Renner, Kenner, Greive, Bobak, Taylor & Weber

(57) ABSTRACT

A drink-blending machine (10) includes an ice-shaving unit (11) and a blender assembly (12). The ice-shaving unit (11) is adapted to transfer ice from a bin (15) to the pitcher (18) of the blender assembly (12). A weighing mechanism (31) includes a deflection beam (33), one end of which carries the pitcher (18). The deflection beam (33) includes a strain gauge (34) which provides a signal proportional to weight to a control circuitry box (30). In operation of the machine (10), a quantity of liquid is placed in the pitcher (18) and dependent upon the weight of ice or liquid-to-ice ratio predetermined by depressing a selected button (44), ice from the ice-shaving unit (11) is transferred to the pitcher (18) until the predetermined weight of ice is received by the pitcher (18).

20 Claims, 5 Drawing Sheets

METHOD AND APPARATUS FOR CONTROLLING THE BLENDING OF DRINKS

TECHNICAL FIELD

This invention relates to a method and apparatus for blending drinks, in particular, drinks made with a portion of liquid and a portion of ice, as is often prepared and served in restaurants, cocktail lounges, or the like. More particularly, this invention precisely controls the portions of the drink so as to provide repeated, consistent drinks.

BACKGROUND ART

Very popular beverages today are those commonly referred to as "frozen" drinks whereby a portion of liquid, which often includes liquor, and a portion of ice are mixed in a blender to create an almost slush-like drink. In the past, the most typical manner to create such drinks required the bartender or other operator to put a quantity of liquor, flavored drink mix, ice and possibly even fruit in the pitcher of a blender, and then operate the blender until that drink is perceived to be adequately mixed. The drink is then transferred from the pitcher of the blender to a glass for consumption by the patron.

Such a procedure has many disadvantages. For example, this procedure requires the constant attention of the operator who, in the sometimes busy environment of a restaurant or cocktail lounge, could be giving his attention to making other drinks while the frozen drink is being prepared. Moreover, even the skilled bartender cannot, in this manner, always make drinks which are consistent in quantity and quality. That is, the operator is required to guess to the correct amount of liquid and ice to put into the blender, dependent on the number of drinks to be made, and if insufficient ingredients are blended, the patron's glass will not be filled on the first try, and the operator will be required to blend additional liquid and ice. Or, as often is the case, the operator may blend too large a quantity of ingredients which, if not eventually used, is wasteful to the economic detriment of the establishment. Moreover, there is no way to assure that the quality of the drink is consistent from drink-to-drink. If patrons have enjoyed a good first drink, they expect that their second drink will be of the same consistency and flavor of their first drink, which cannot always happen when the operator is required to "eyeball" the amount of liquid relative to the amount of ice to be blended.

One proposed solution to at least some of the aforementioned problems is to provide a combined ice dispenser and blender whereby the functions of each are controlled by time. Such is shown, for example, in U.S. Patent No. 4,528,824 and 4,681,030. In these devices, an attempt is made to control the amount of ice to be delivered to the blending cup by operating an ice shaver for a predetermined amount of time. Then, after a predetermined time delay, the blender operates for a preselected amount of time. However, repeatably consistent drinks cannot be made by such a device in that there is no correlation between the amount of liquid which is manually placed in the cup of the blender and the amount of ice to be delivered. Moreover, using time as the operative control parameter does not assure that the correct or precise quantity of ice has been added. For example, the ice machine might be almost empty, thereby not having a sufficient quantity of ice for the drink, yet this prior art device would run for a predetermined time and deliver an incorrect quantity of ice. Or, even if there was sufficient ice in the machine, it will not always be delivered at a uniform rate and might not even be delivered at all, as could happen if the ice delivering blades were operating in a dead air space created by an arching of the ice in the machine.

Thus, controlling the operation of a drink-making machine using time as the controlling parameter does not adequately solve the problems prevalent in the art.

DISCLOSURE OF THE INVENTION

It is thus an object of the present invention to provide a method and apparatus in the form of an ice shaver and blender for preparing drinks which creates a repeatably consistent quality drink.

It is another object of the present invention to provide a method and apparatus, as above, in which the precise desired amount of ice, by weight, is metered into the blender.

It is a further object of the present invention to provide a method and apparatus, as above, in which the quantity of ice metered to the blender is dependent on the weight of the liquid in the blender.

It is an additional object of the present invention to provide a method and apparatus, as above, which creates drinks of a repeatably consistent quantity.

It is yet another object of the present invention to provide a method and apparatus, as above, which allows the drink maker to use his time efficiently.

It is still a further object of the present invention to provide a method and apparatus, as above, in which errors by the drink maker in creating a drink are reduced, if not eliminated.

These and other objects of the present invention, as well as the advantages thereof over existing prior art forms, which will become apparent from the description to follow, are accomplished by the improvements hereinafter described and claimed.

In general, a method of making a liquid and ice drink, in accordance with the present invention, utilizes a blender and a source of ice and includes the steps of placing a quantity of liquid in the pitcher of the blender, and transferring ice from the ice source to the pitcher until a predetermined weight of ice is received by the pitcher.

In accordance with another aspect of the present invention, the method of making a liquid and ice drink utilizing a blender and an ice dispenser includes the steps of weighing an empty pitcher of the blender, placing an arbitrary amount of liquid in the pitcher, selecting a desired liquid-to-ice ratio for the drink, starting the blender, weighing the pitcher with the liquid therein, determining the weight of the liquid by subtracting the weight of the empty pitcher from the weight of the pitcher with the liquid therein, initiating the transfer of the ice from the dispenser to the pitcher, terminating the transfer of ice when the determined weight of the ice matches the selected liquid-to-ice ratio, and stopping the blender.

Yet another method of making a liquid and ice drink, in accordance with the present invention, which utilizes a blender and an ice dispenser, includes the steps of placing a quantity of liquid in the pitcher of the blender, selecting the weight of ice to be added to the pitcher, weighing the pitcher and liquid to determine an initial weight, initiating the transfer of ice from the dispenser to the pitcher, weighing the pitcher with the liquid therein as the ice is being transferred to determine a current weight, subtracting the initial weight from the current weight to determine the weight of the ice, stopping the transfer of ice when the weight of the ice matches the selected weight, and operating the blender to mix the drink.

An apparatus made in accordance with the present invention for controlling the mixing of a drink includes a blender having a pitcher and an ice machine adapted to transfer ice to the pitcher. A weighing mechanism is provided to determine the weight of the transferred ice. The weighing mechanism initiates the stopping of the transfer of the ice to the pitcher when a predetermined weight of ice is in the pitcher.

A preferred exemplary apparatus for controlling the blending of drinks, and its method of operation, incorporating the concepts of the present invention, is shown by way of example in the accompanying drawings without attempting to show all the various forms and modifications in which the invention might be embodied, the invention being measured by the appended claims and not by the details of the specification.

PREFERRED EMBODIMENT FOR CARRYING OUT THE INVENTION

Figure 1:
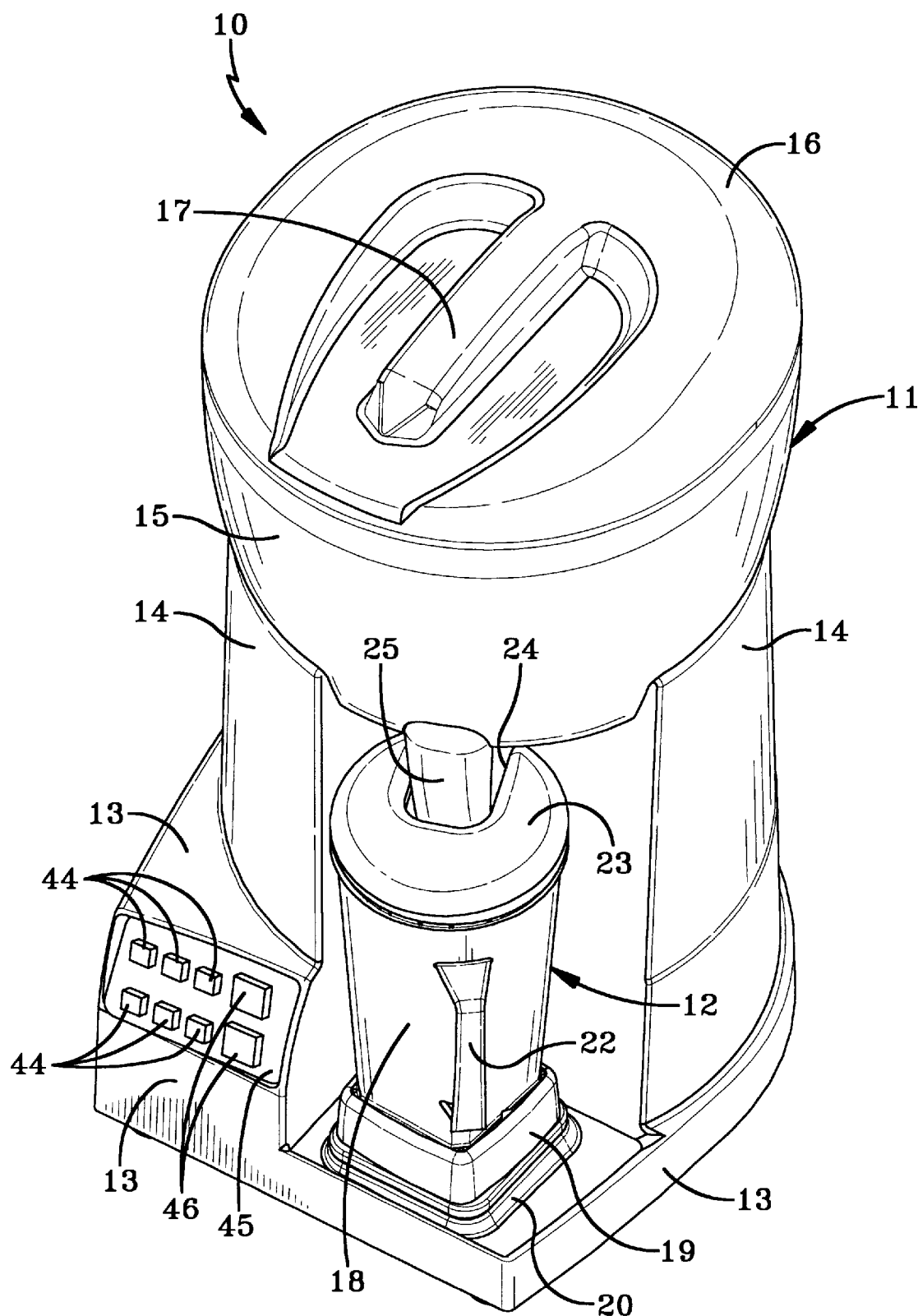
FIG. 1 is a perspective view of an ice shaver and blender device made in accordance with the concepts of the present invention.

A drink-blending machine is indicated generally by the numeral 10 and is shown in FIG. 1 as including two basic components, an ice dispenser preferably in the form of an ice-shaving unit generally indicated by the numeral 11, and a blender assembly generally indicated by the numeral 12. Drink-blending machine 10 also includes a base portion 13 which supports a partially cylindrical pedestal 14 which, in turn, supports an ice bin 15 which is part of ice-shaving unit 11 and is adapted to carry a supply of ice. Ice-shaving unit 11 also includes a lid 16 for closing bin 15, lid 16 having a handle 17 so that it can readily be removed from bin 15 to position ice therein. Unless otherwise evident, all components of machine 10 can be fabricated of any suitable plastic material, and it is preferable to form bin 15 of a transparent material so that the user can observe the quantity of ice maintained therein.

Blender assembly 12 includes a container or pitcher 18 having a base 19 which is received by, and carried by, a pad 20. Pad 20 includes locators 21 generally near the corners thereof to receive a mating structure (not shown) on the bottom of base 19. Pitcher 18 includes a conventional handle 22 and cover 23, with cover 23 having a slot 24 therein to receive an ice chute 25 therethrough. Chute 25 thus enables bin 15 to communicate with pitcher 18 so that ice may pass from ice-shaving unit 11 to pitcher 18.

Figure 2:
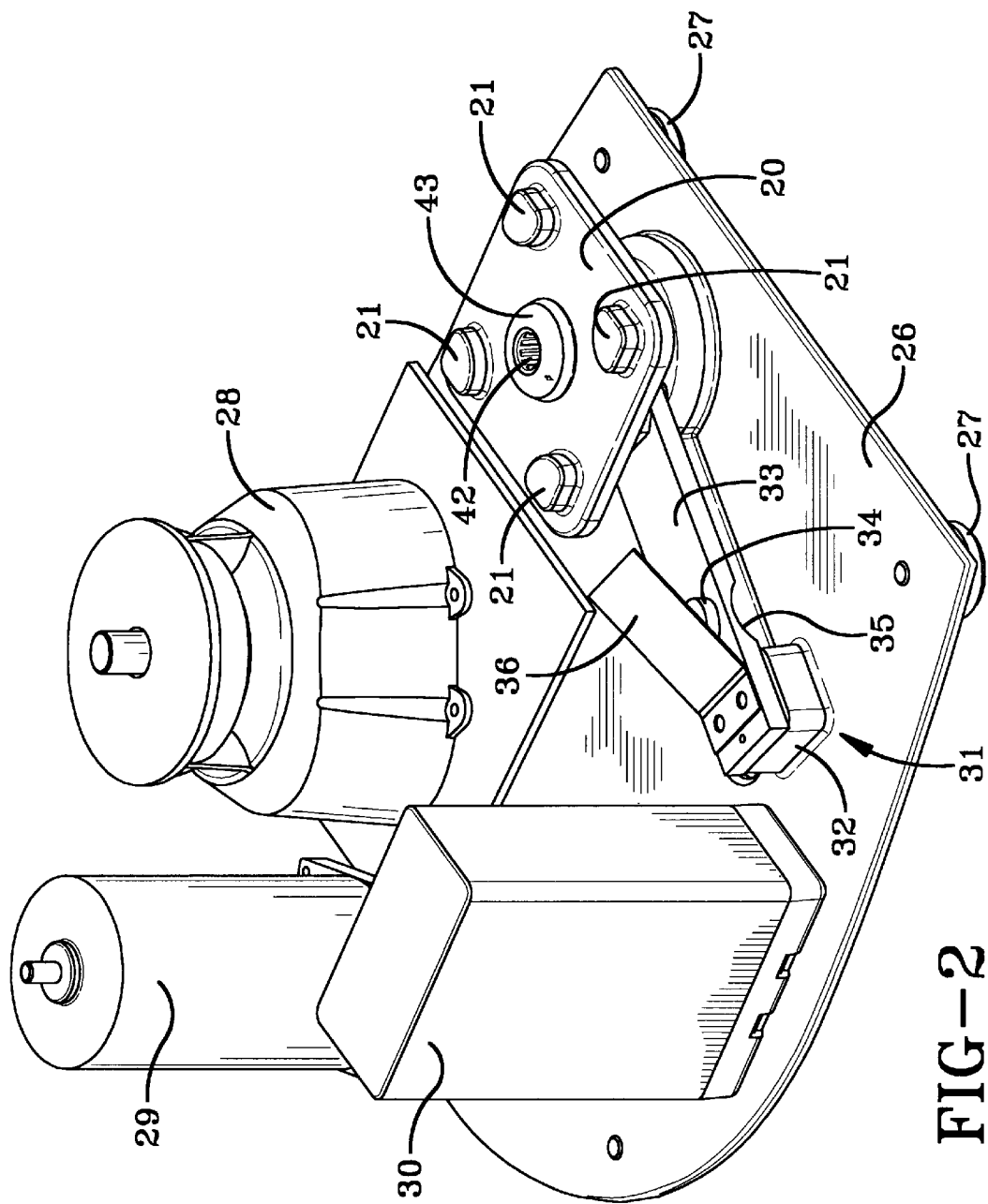
FIG. 2 is a somewhat schematic view of some of the internal components of the device shown in FIG. 1.

Base portion 13 and pedestal 14 internally house the operating components of drink-blending machine 10. As schematically shown in FIG. 2, the bottom of base portion 13 includes a support plate 26 having feet 27 depending downwardly therefrom, generally at the corner edges thereof, to support machine 10. Plate 26 carries a blender motor 28, an ice-shaver motor 29, an electronic control circuitry box 30, and a weighing mechanism generally indicated by the numeral 31.

Although the precise details of the operation of drink blending machine 10 will be hereinafter described in more detail, in general the operator places the liquid or other ingredients of the drink to be created into pitcher 18. The liquid could include a drink mix and an alcoholic beverage, and the other ingredients could include whole or sliced fruit or the like. Individually, or collectively, these ingredients will be referred to herein as a "liquid." In a conventional manner, ice-shaver motor 29 causes blades (not shown) to shave the ice at the bottom of bin 15, which ice passes through chute 25 and into pitcher 18. In a likewise conventional manner, blender motor 28 causes a blade or agitator (not shown) positioned near the bottom of pitcher 18 to mix the liquid and ice until the drink is completed.

In accordance with the present invention, weighing mechanism 31 is provided to determine the precise amount of ice to be positioned in pitcher 18. Weighing mechanism 31 includes a pedestal 32 positioned on plate 26 which carries one end of a deflection beam 33. Beam 33 is provided with a conventional strain gauge 34 positioned above a recessed or thinned-out area 35 of beam 33. The other end of beam 33 carries pad 20. Thus, the entire weight of pad 20 and pitcher 18 is suspended on the end of beam 33. A flap guard 36 is shown as being mounted on beam 33 and extends above strain gauge 34 to protect it from damage by undesired contact. As will hereinafter be described in more detail, and as is well known in the art, strain gauge 34 provides a signal proportional to weight to the circuitry in control box 30.

Figure 3:
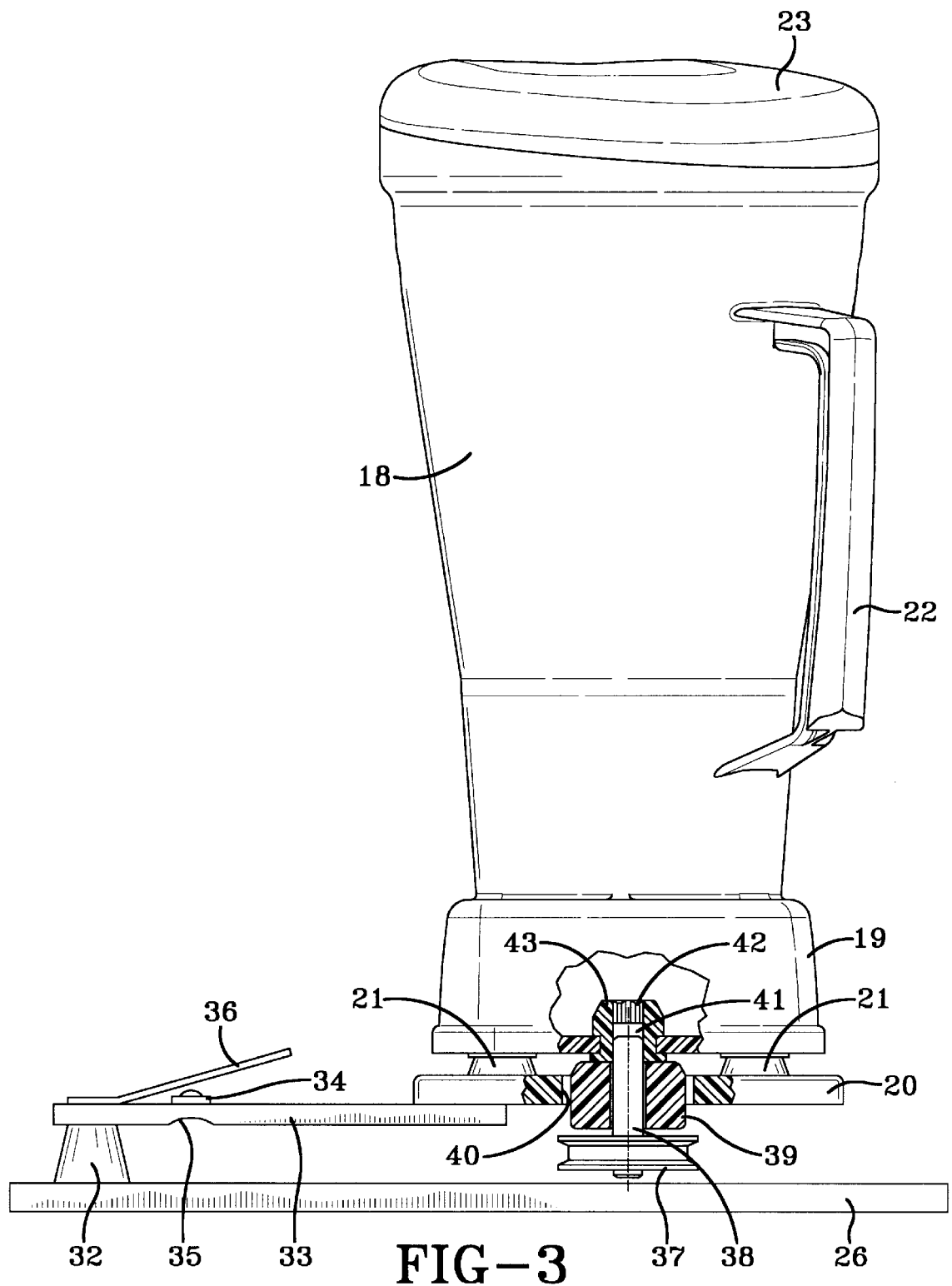
FIG. 3 is a somewhat schematic, partially broken away and sectioned, side elevational view particularly depicting the weighing mechanism utilized by the device shown in FIG. 1.

The manner in which blender assembly 12 is operated by motor 28 is somewhat schematically shown in FIG. 3. Motor 28, via a belt (not shown), drives a pulley 37 which rotates a stub shaft 38. Shaft 38 extends through a bearing housing 39 which is received through, but does not engage, an opening 40 in pad 20. At least the upper portion of shaft 38 is squared to be received in a squared bore 41 of a shaft coupler 43 so as to rotate coupler 43. Shaft coupler 43 also includes a splined bore 42 opposite or vertically adjacent to squared bore 41.

The shaft (not shown) which drives the blade of the blending assembly 12 is likewise splined so that it and pitcher 18 are moveable vertically relative to coupler 43, yet the shaft is engaged for rotation by coupler 43.

By means of weighing mechanism 31 and conventional electronic circuitry positioned in control box 30, which circuitry could be designed in various forms, as known to one skilled in the art, to carry out the various required functions, drink-blending machine 10 can operate by various methods to blend a drink in accordance with the present invention. The operation is controlled by series selection buttons 44 located on a touch pad 45 on the front of base portion 13, each selection button 44, as will hereinafter be described, providing differing instructions to the electronic circuitry. In addition, pad 45 may be provided with a number of other buttons 46 for preforming calibration, programming and other functions.

Figure 4:
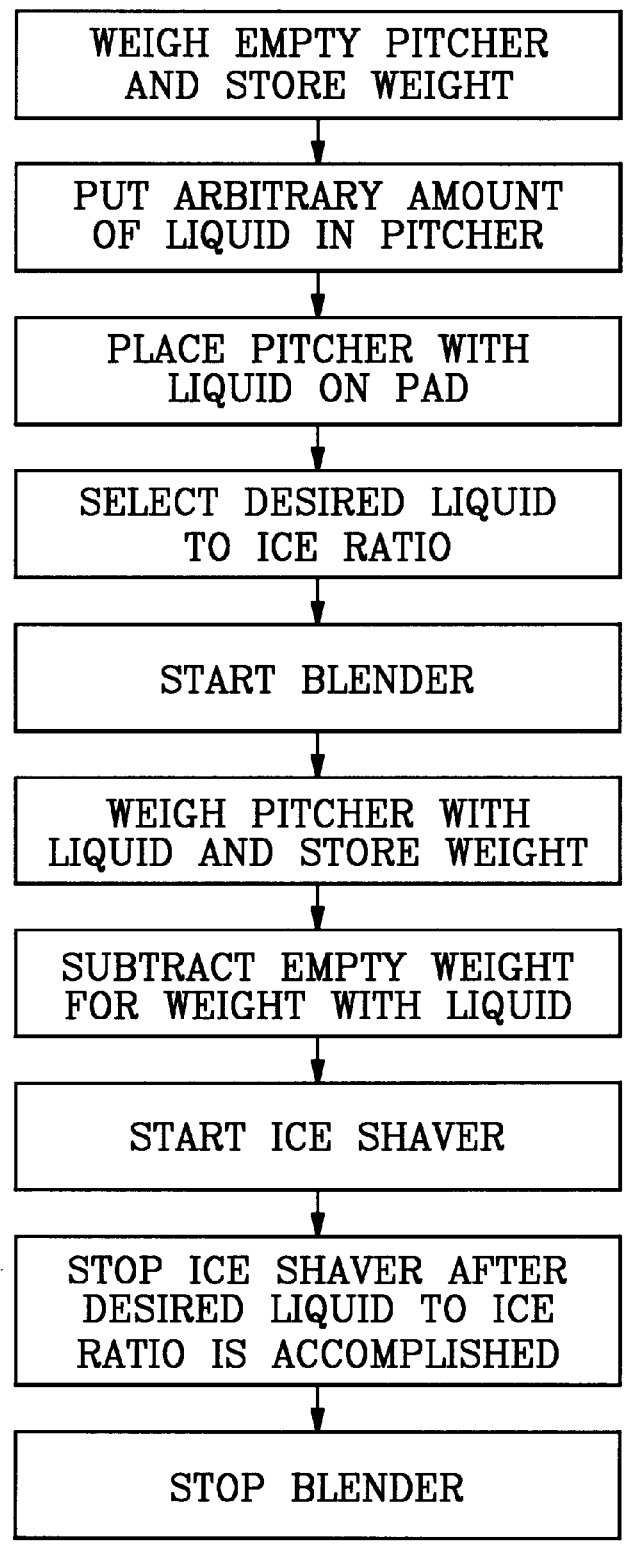
FIG. 4 is a block diagram depicting one method of operation of the device in accordance with the concepts of the present invention.

One preferred method of operation is depicted in FIG. 4. Machine 10 is first calibrated by placing an empty pitcher 18 on pad 20 and then pressing a calibration button 46. Preferably, the blender may be started at this time, for a dry run, for the purpose of freeing the interaction of coupler 43 and the spline on the blender shaft. Strain gauge 34 then provides a signal proportional to the empty pitcher weight to the electronic circuitry, which indicia is stored in a register therein. This calibration process would only need to be repeated if a new pitcher were used or if, through a vast amount of use, there may be a suspicion that the pitcher weight had changed.

With the empty pitcher weight now being known, in the method of FIG. 4, the user need only put any arbitrary amount of liquid into pitcher 18. Of course, the skilled user, if he knew, for example, that he were mixing two drinks, would likely attempt to place enough liquid mix for two drinks into pitcher 18. But such is not necessary because in accordance with the method of FIG. 4, the precise amount of ice, dependent on the desired liquid-to-ice ratio, will be supplied to pitcher 18. To that end, after the arbitrary amount of liquid is placed into pitcher 18, it is placed on pad 20. The operator then depresses one of the selection buttons 44 on touch pad 45 to instruct the electronic circuitry to provide a certain amount of ice, by weight, to pitcher 18. Each button 44 will have a different ratio ascribed to it, a ratio identifiable by the circuitry. For example, one button 44 may signal the circuitry that a one-to-one ratio of ice and liquid is desired, whereas another button 44 may be used for a one-to-two ratio or the like. The providers of the liquid drink mix usually instruct the user relative to the desired ratio for their mix.

Thus, the operator, knowing the desired liquid mix-to-ice ratio, depresses or touches the corresponding button 44 at which time the blender is preferably started by activation of motor 28. After a very short pause, to assure that the interaction of coupler 43 and the spline on the blender shaft is free, the weight of the pitcher filled with the liquid is read by the strain gauge 34 and stored in a register in the electronic circuitry. The empty weight of pitcher 18 is then subtracted from the weight of pitcher 18 with the arbitrary amount of liquid therein (to determine and store the weight of the liquid) and the ice shaver is started by activation of motor 29. At this point in time, the weight of the pitcher, liquid and ice, is monitored by gauge 34, and when the desired weight is reached, which now includes the predetermined weight amount of ice (dependent on the ratio selected), ice shaver 11 is stopped and the blender will continue to run for a time period dependent on the total weight of the drink. That is, for example, if a one-to-one ratio has been selected, ice shaver 11 will stop when a weight of ice equal to the weight of liquid has been obtained, and the blender 12 will be programmed to run for a further time, which may be longer or shorter if a different ratio were selected.

As a result, no matter what amount of liquid is added to the pitcher, the desired proportional amount of ice will be added, resulting in a drink of perfect, repeatable consistency. Such would result even if the user under-poured or over-poured the original amount of liquid.

Figure 5:
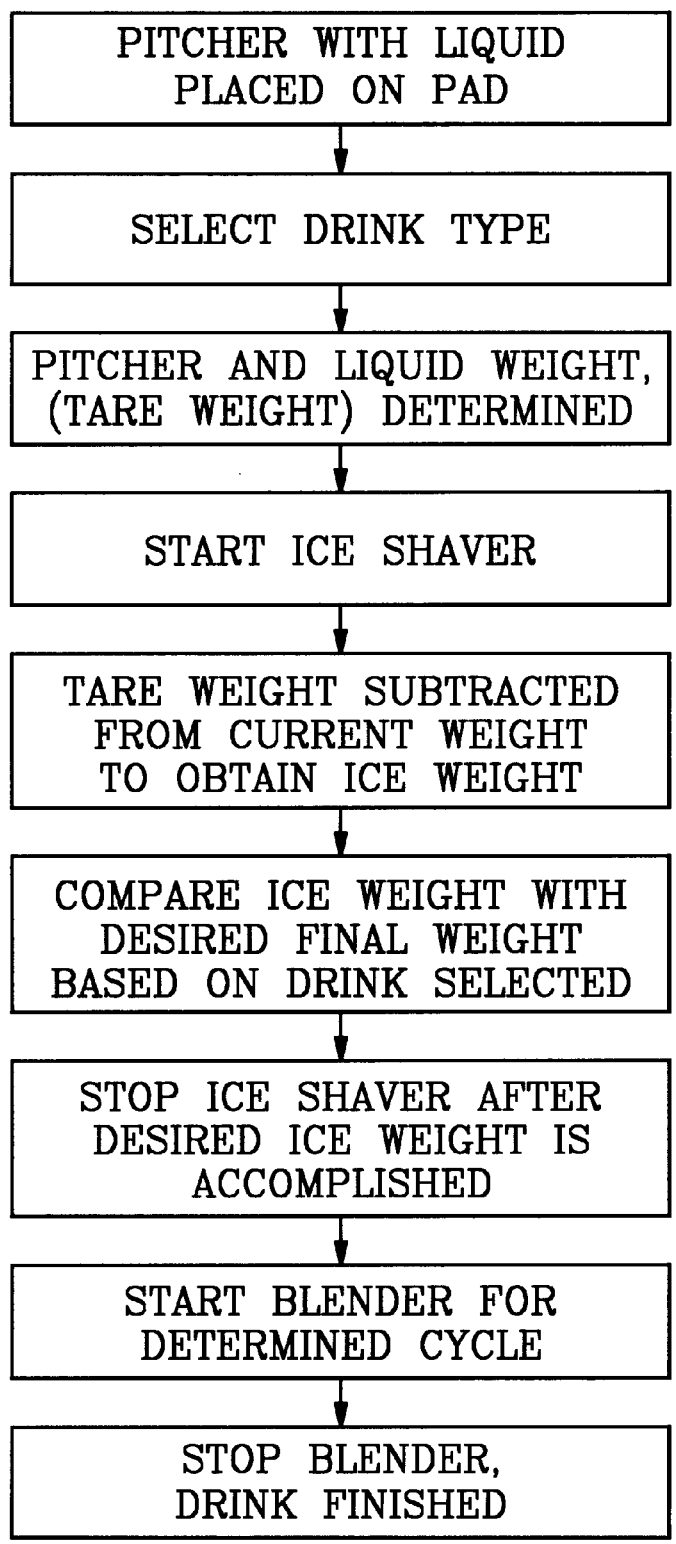
FIG. 5 is a block diagram depicting another method of operation of the device in accordance with the concepts of the present invention.

FIG. 5 shows one of several other modes of operation for machine 10. In this mode, the user fills the pitcher with his best estimation of the approximate amount of liquid desired, dependent on the number or size of drinks to be made. The user then depresses or touches the appropriate button 44, with buttons 44 in this instance being programmed to tell the machine how many drinks are intended to be made, and therefore how much ice, by weight, will be needed. For example, one button 44 may dictate one six-ounce drink, and another button 44 may dictate a twelve ounce drink, or two six-ounce drinks. The weight of the pitcher 18 with the liquid therein, often called the tare weight, is then determined by strain gauge 34 and the tare weight is stored in a register of the circuitry. Ice shaver 11 is then activated to provide ice to the pitcher and the current weight thereof is continually monitored by gauge 34. The tare weight is subtracted from the current weight to determine the weight of the ice which has been added. This ice weight is compared with the final ice weight based on the drink selected, that is, dependent on which button 44 has been depressed. When the current ice weight matches the final ice weight, ice shaver 11 is stopped and the blender started. Dependent on the quantity of the drink selected, the blender will run a predetermined time and then stop. A drink of perfect quality, and of a desired quantity, may now be served.

Other minor variations to the method of FIG. 5 just described are contemplated by the present invention. In some instances, and for certain types of drinks, for example, it may be desirable to start the blender at the time the drink type is selected and before ice shaver 11 is started. Then, if desired, before the tare weight is determined, as in the method of FIG. 4, the blender may run a few moments to free the interaction of the coupler 43 and the spline drive for the blender which could result in a more accurate tare weight reading.

In view of the foregoing, it should thus be evident that a machine constructed and operated as described herein will be controlled based on weight measurements being obtained to produce drinks of a consistent quality and quantity, thereby accomplishing the objects of the present invention and otherwise substantially improving the art.

What is claimed is:

1. A method of making a liquid and ice drink utilizing a blender and a source of ice comprising the steps of placing a quantity of liquid in the pitcher of a blender, and transferring ice from the source of ice to the pitcher until a predetermined weight of ice is received by the pitcher to make a liquid and ice drink.

2. The method according to claim 1 wherein the predetermined weight of ice equals a selected liquid-to-ice ratio.

3. The method according to claim 2 wherein the source of ice is an ice dispenser and the step of transferring ice includes the steps of initiating the dispensing of the ice, weighing the ice dispensed, and stopping the dispensing of the ice when the selected liquid-to-ice ratio is reached.

4. The method according to claim 3 wherein the step of weighing includes the step of determining the weight of the liquid.

5. The method according to claim 4 wherein the step of determining includes the steps of weighing the empty pitcher, weighing the pitcher with the liquid therein, and subtracting the weight of the empty pitcher from the weight of the pitcher with the liquid therein.

6. The method according to claim 1 further comprising the step of starting the blender before the step of transferring.

7. The method according to claim 6 further comprising the step of stopping the blender after the step of transferring.

8. The method according to claim 1 wherein the predetermined weight of ice is dependent on the quantity of the liquid.

9. The method according to claim 8 wherein the source of ice is an ice dispenser and the step of transferring ice includes the steps of initiating the dispensing of the ice, weighing the ice dispensed, and stopping the dispensing of the ice when a predetermined weight of the ice is reached.

10. The method according to claim 9 wherein the step of weighing the ice includes the steps of weighing the pitcher with the liquid therein to determine an initial weight, weighing the pitcher with the liquid therein as the ice is being transferred to the pitcher to determine a current weight, and subtracting the initial weight from the current weight to determine the current weight of the ice.

11. The method according to claim 10 further comprising the step of comparing the current weight of ice with the predetermined weight of ice an d commencing the step of stopping the dispensing when the current weight of ice equals the predetermined weight of ice.

12. The method according to claim 1 further comprising the step of starting the blender after the step of transferring.

13. A method of making a liquid and ice drink utilizing a blender and an ice dispenser comprising the steps of weighing an empty pitcher of the blender, placing an arbitrary amount of liquid in the pitcher, selecting a desired liquid-to-ice ratio for the drink, starting the blender, weighing the pitcher with the liquid therein, determining the weight of the liquid by subtracting the weight of the empty pitcher from the weight of the pitcher with the liquid therein, initiating the transfer of ice from the dispenser to the pitcher, terminating the transfer of ice when the liquid-to-ice ratio matches the selected liquid-to-ice ratio, and stopping the blender.

14. A method of making a liquid and ice drink utilizing a blender and an ice dispenser comprising the steps of placing a quantity of liquid in the pitcher of the blender, selecting a weight of ice to be added to the pitcher, weighing the pitcher and liquid to determine an initial weight, initiating the transfer of ice from the dispenser to the pitcher, weighing the pitcher with the liquid therein as the ice is being transferred to determine a current weight, subtracting the initial weight from the current weight to determine the weight of the ice, stopping the transfer of ice when the weight of the ice matches the selected weight, and operating the blender to mix the drink.

15. Apparatus for controlling the amount of ice for a drink comprising a blender having a pitcher, an ice dispenser for transferring ice to said pitcher, and a weighing mechanism to determine the weight of the transferred ice, said weighing mechanism initiating the stopping of the transfer of the ice to said pitcher when a predetermined weight of ice is in said pitcher.

16. The apparatus according to claim 15 wherein said weighing mechanism includes a deflection beam having one end carrying said pitcher, and a strain gauge on said beam to measure the weight of said pitcher and the content of said pitcher.

17. The apparatus according to claim 16 further comprising an electronic control communicating with said strain gauge to receive weight information from said strain gauge.

18. The apparatus according to claim 17 further comprising a plurality of selection buttons, each said selection button, upon activation, providing different information to said electronic control regarding the desired weight of the ice to be transferred.

19. The apparatus according to claim 18 further comprising a motor to operate said blender, said electronic control operating said motor in accordance with information received.

20. The apparatus according to claim 18 further comprising a motor for said ice dispenser, said electronic control operating said motor in accordance with information received.

* * * * *